US007028087B2

(12) United States Patent
Caveney

(10) Patent No.: US 7,028,087 B2
(45) Date of Patent: Apr. 11, 2006

(54) NETWORK DOCUMENTATION SYSTEM WITH ELECTRONIC MODULES

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 638 days.

(21) Appl. No.: 10/060,608

(22) Filed: Jan. 30, 2002

(65) Prior Publication Data

US 2002/0120773 A1    Aug. 29, 2002

Related U.S. Application Data

(60) Provisional application No. 60/270,811, filed on Feb. 23, 2001, provisional application No. 60/297,289, filed on Jun. 11, 2001.

(51) Int. Cl.
*G06F 15/16* (2006.01)

(52) U.S. Cl. ........................................ 709/224; 709/252

(58) Field of Classification Search ................ 709/245, 709/224, 252; 370/245, 248; 715/734
See application file for complete search history.

(56) References Cited

U.S. PATENT DOCUMENTS

| | | | |
|---|---|---|---|
| 5,185,860 A | * | 2/1993 | Wu ........................... 709/224 |
| 5,226,120 A | | 7/1993 | Brown et al. |
| 5,521,902 A | | 5/1996 | Ferguson |
| 5,675,741 A | | 10/1997 | Aggarwal et al. |

(Continued)

FOREIGN PATENT DOCUMENTS

FR    2680067    8/1991

(Continued)

OTHER PUBLICATIONS

Cable Management, The Great Cabling Treasure Hunt, by Mary Jander, Data Communications, dated Mar. 21, 1991, pp. 51-54.

*Primary Examiner*—Marc D. Thompson
(74) *Attorney, Agent, or Firm*—Robert A. McCann; Zachary J. Smolinski

(57) ABSTRACT

A documentation system for a network having a source device which is connected to multiple network paths which are connected to destination devices, the documentation system comprising, a data port which includes an electronic module with an identification code on each of two or more of the network paths, each of the destination devices including an electronic module with an identification code, the source device having the capability to send query signals along a designated network path addressed to a data port and destination device corresponding to the designated network path, the electronic module corresponding to the data port responding to the query addressed to the data port by transmitting its identification code to the source device, and the electronic module of the destination device responding to the query addressed to the destination device by transmitting its identification code to the source device, and a processor and a scanner in communication with the source device, the processor and scanner for directing the source device to send the query signals and to interpret the responses.

8 Claims, 2 Drawing Sheets

U.S. PATENT DOCUMENTS

| | | | |
|---|---|---|---|
| 5,726,972 A | 3/1998 | Ferguson | |
| 5,854,824 A | 12/1998 | Bengal et al. | |
| 5,917,808 A * | 6/1999 | Kosbab | 370/254 |
| 5,948,055 A * | 9/1999 | Pulsipher et al. | 709/202 |
| 6,377,987 B1 * | 4/2002 | Kracht | 709/220 |
| 6,496,859 B1 * | 12/2002 | Roy et al. | 709/223 |
| 6,665,715 B1 * | 12/2003 | Houri | 709/223 |
| 6,778,524 B1 * | 8/2004 | Augart | 370/351 |
| 2003/0154273 A1 * | 8/2003 | Caveney | 709/223 |

FOREIGN PATENT DOCUMENTS

| | | |
|---|---|---|
| GB | 2236398 | 4/1991 |

* cited by examiner

NETWORK DOCUMENTATION SYSTEM WITH ELECTRONIC MODULES

RELATED APPLICATIONS

This application is claiming priority to the following previously filed U.S. provisional patent applications: Ser. Nos. 60/270,811 filed Feb. 23, 2001; and 60/297,289 filed Jun. 11, 2001; the entirety of the previously filed applications being incorporated herein by reference.

BACKGROUND OF THE INVENTION

As communication network utilization and technology continues to escalate, the typical local area network (LAN) is simultaneously growing larger and denser, and it is increasingly desirable and advantageous to continuously document the physical paths of network interconnections and the physical locations of network components, including network connectors or ports in such paths and destination devices, e.g., personal computers or telephones.

Such a documentation system provides many advantages, including facilitating the planning and revision processes, the determination of the location of the physical area of a discontinuity in the network path, and the determination of the physical locations of destination devices.

SUMMARY OF THE INVENTION

There is provided a documentation system for a network having a source device which is connected to at least one destination device through at least one intermediate network path element. The source device has the capability to transmit a query signal directed to any destination device to which it is connected and each destination device has the capability to send a response signal containing its identification code back to the source device. In addition, the source device has the capability to transmit a query signal directed to any intermediate network path element which has a physical location in a designated zone, and an electronic module in the intermediate network path element has the capability to return a response signal containing its identification code back to the source device.

The network documentation system utilizes software to direct the source device to sequentially send query signals directed to destination devices to which it is connected and to intermediate network path elements in each designated zone to which it is connected. The response signals are interpreted by the software to document the network configuration.

DETAILED DESCRIPTION OF PREFERRED EMBODIMENTS

Figure 1:
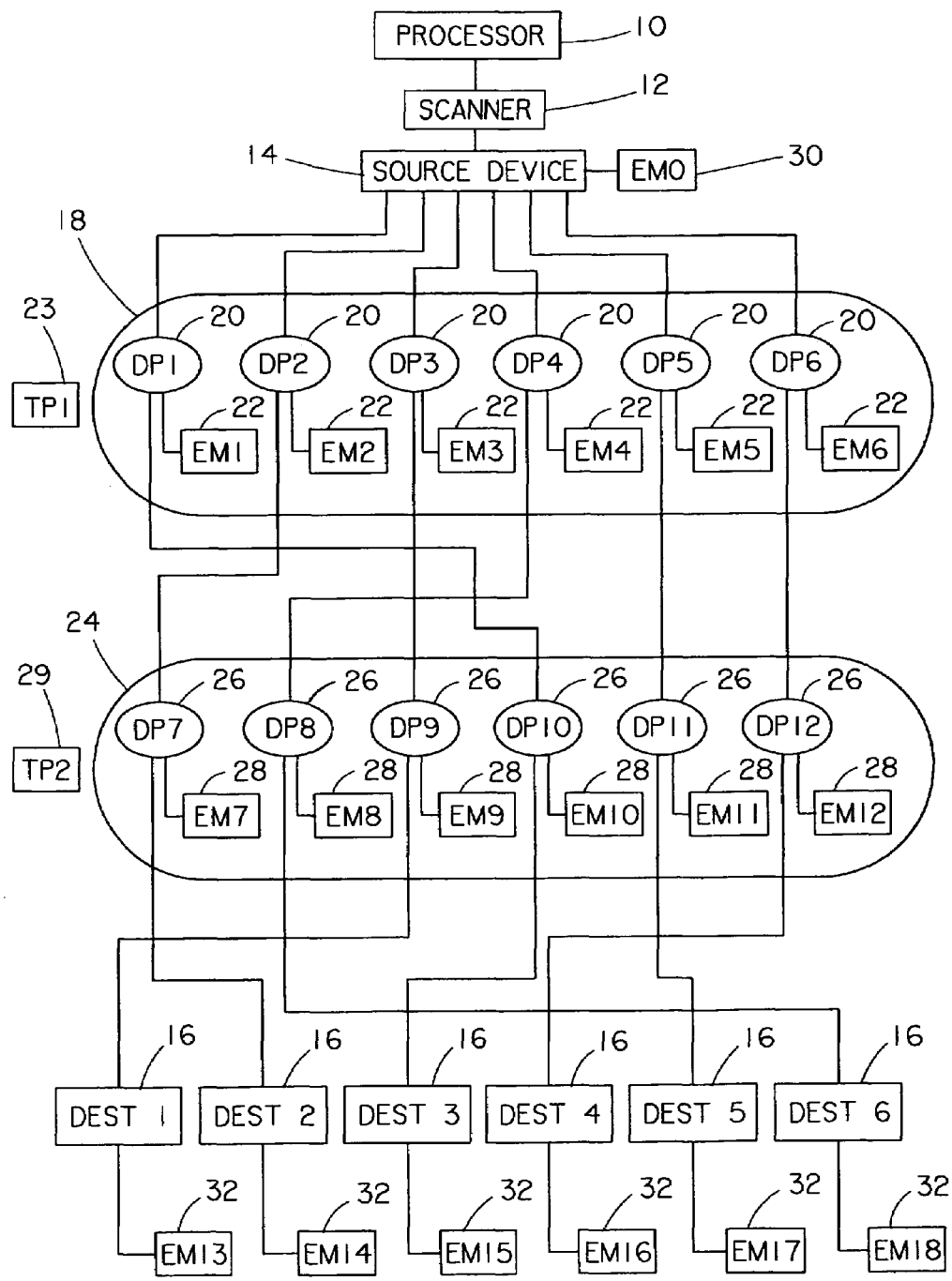
FIG. 1 is a schematic view of a documentation system in accordance with a first embodiment of the invention.

The invention is directed to apparatus and methods which automatically provide documentation of a network system, hereinafter called "the system". The complete disclosures of the previously filed provisional patent applications Ser. Nos. 60/270,811 filed Feb. 23, 2001; and 60/297,289 filed Jun. 11, 2001 are incorporated herein by reference, as are any patent applications which they incorporate by reference.

To improve the accuracy, efficiency and capability of documenting a network system, electronic modules are placed into electronic communication with corresponding ports or nodes of the network such that connecting apparatus, connecting the respective ports or nodes to a source device, also provide a mechanism by which query and response signals may be routed between the source device and the connected ports or nodes in the system in the same manner that data signals may be transmitted between them. The signals may be transmitted over the same or a different medium from the data signals (e.g., common or separate wire or fiber). The electronic modules have associated identification elements that may have a single component or multiple components, and the modules are capable of receiving and recognizing query signals directed to them and responding by transmitting their identification code back to the source device. Thus, the system may utilize signals directed toward and received from all of the respective data ports or nodes in the system and thereby formulate a "map" of the entire system as it is physically configured.

The inventive documentation and fault detection system contemplates the preferable use of electronic modules in every final destination device within a network, as well as in every network port which connects the source device to the final destination devices. Each module can receive a query signal from a source, e.g., a switch, and ascertain whether the signal is directed to it by the use of address codes. In a preferred embodiment of the invention, each electronic module which is in a designated physical location zone within the system has a unique zone address code. In some preferable embodiments of the invention, the ports and their corresponding modules may be stratified into "zones" based on their relative proximity, in an electrical or communications sense, to the source device and/or the final destination device. In these embodiments, since each signal ultimately travels only along one path given a particular network configuration, every port/module within a particular zone has the same zone addressing information, however each module retains a unique identification code which is transmitted to the source device in response to a query directed to it.

For example, a typical network may include a pair of patch panel ports for cross-connecting between a source and one or more destinations. In such an arrangement, the group of patch panel ports (and the electronic modules contained therein) closer to the source from a communications standpoint (i.e., the signal path direction) would be classified as zone 1. The next group of ports/modules along the signal path (i.e., the patch panel ports closer to the destination devices would be classified as zone 2 in this example. The destination devices would be classified as zone 3.

The source sequentially sends a signal along respective output paths directed to any module along the path having a specified zone address. The one module in such zone along each respective path then, in turn, transmits back to the source when it receives the signal intended for its zone. The return signal includes the identification code of the module returning the signal. Using this procedure and information previously known to the documented system (e.g., the physical location of each port as identified by the unique identification codes thereof), the system can map (i.e. document) which ports and destination devices are connected along any particular signal path.

As stated above, such a map is useful in conducting subsequent network reconfigurations. Such reconfigurations may occur, for example, to switch the source device port which is connected to a particular destination device. Such reconfigurations can be done electronically with some source devices. Network reconfigurations typically entail a revisor performing a series of revisions to the cords connecting respective ports in the network. Sometimes it is necessary to install a new cord to connect two previously open ports within the network, thereby adding ("addition") a cord to the system. Other times, one needs to remove ("removal") an already installed cord, thereby disconnecting two ports previously connected to one another. Sometimes, one end of a cord needs to be moved from one port to another ("transfer") within the network while the other end of the cord remains in its port. In an automatic documentation and reconfiguration management system, such as one controlled by a computer or processor as described in the references incorporated herein, a reconfiguration typically involves a series of instructions, i.e., additions, removals, and transfers, communicated by the system to the revisor.

The invention may utilize a portable test plug connected to a test port including an electronic module therein referred to as a revision system module. The system may also include a portable screen or display such that when it is in communication with the documentation/revision system, it can communicate instructions to the revisor. For example, the display may communicate an ordered sequence of cord revisions for the revisor to perform, or may simply indicate one such cord revision at a time until the revisor has performed all of the necessary steps in a reconfiguration.

The revision system module has a unique zone address, e.g., zone 0, incorporated therein. This feature facilitates multiple independent revisors making concurrent revisions to the system, as each revision system module, is designated with a distinct zone number so that the system can readily distinguish between them.

In a first embodiment of the invention, during a revision or reconfiguration process, when a cord addition is required and the two LAN ports needing to be connected have been identified to the revisor, the revisor plugs the test plug into the LAN port closer to the source from a communication standpoint, and the system communicates whether such LAN port has been correctly found, e.g., whether a signal addressed to zone 1 along the specified path is properly acknowledged by the module associated with the test plug. As both the test port and the LAN port include electronic modules therein capable of transmitting and receiving signals, communication between them is possible such that it can be ascertained whether the test plug has been inserted into the correct LAN port. If, in fact, the revision has correctly found the identified LAN port, one end of the cord to be added is plugged into the found LAN port. The revisor then moves to the LAN port farther from the source from a communication standpoint and tests whether the second LAN port is the appropriate one by inserting the test plug. Again, the respective electronic modules communicate and, if the test plug is plugged into the correct LAN port, the other end of the cord to be added is plugged into the verified second LAN port. At this point, the system can confirm that the addition has been correctly completed based on communication between the source device and the electronic modules in the two LAN ports connected by the newly added cord. It is preferable that the revisor perform the addition steps in the order described, the port closer to the source and then the port farther from the source rather than in a reverse order, to enable the system to confirm proper completion of the steps by sending signals from the source device to the newly connected ports. If the reverse order were followed, a signal from the source device could not reach the farther port since the closer port would not be providing a connection between the source and the farther port.

To perform the removal of an already installed cord in the first embodiment of the invention, the revisor likewise is provided with information identifying the two data ports from which the cord needs to be removed. The revisor first proceeds to the LAN port farther from the source from a communication standpoint and removes the plug from the found LAN port. The system can then confirm that the plug has been removed by the inability of the electronic module corresponding to that LAN port to communicate with the source device and, more specifically, for a query signal emanating from the source device to be acknowledged by the electronic module in the farther port. At this point, the revisor proceeds to the LAN port closer to the source from a communication standpoint and removes the cord plug inserted therein. The test plug may then be inserted into this LAN port to verify to the revisor that he has removed the correct plug from the correct LAN port. As with the addition, it is preferable that the revisor follow the correct order of steps relative to the two ports involved in a removal so that the system can internally ascertain correct performance of the respective steps thereof.

A transfer can be performed in accordance with an embodiment of the invention by removing the plug on the end of the cord to be transferred from its LAN port, with the system confirming this step by the break in communication between the source device and the electronic modules of a port previously connected. A test plug can be used to verify that the correct LAN port at the new destination has been located. The plug just removed from the LAN port is then inserted into the new LAN port destination and the system confirms the transfer process by the ability of the source device to communicate with the electronic modules to which it is connected.

Each electronic module in the system would require a power supply which, in various embodiments of the invention, could be provided by a pair of conductors which could also be signal pairs or a battery. In a network system employing twisted wire pairs for carrying signals, the system could use one or more of the signal pairs to receive and transmit signals to and from particular electronic modules, including those associated with particular destination devices, sources, and network ports there between from a communications standpoint. A fiber optic or other LAN system could incorporate two conductors in each cable to be adapted for the same purpose.

As seen in FIG. 1, in a preferred embodiment of the invention, a computer or processor 10 is electrically connected to a scanner 12. At the direction of the processor, the scanner may periodically or on-demand poll one or more of the data ports in the system to ascertain information about the ports. Such polling may occur on a zone-by-zone basis, with the source device sequentially sending a signal, such as a query signal, along respective output lines directed to any electronic module along the path having the specified zone address. The identified module may then return its identification code back to the source. In this manner, the entire system may effectively be mapped (i.e., documented). The scanner may preferably be in communication with a source device 14 and one or more destination devices 16.

A first zone 18 of data ports 20 may preferably be congregated on a single patch panel or network rack, and each of the data ports 20 is electrically connected directly with the source device 14. Each of the data ports 20, identified as "DP" in the figures, has an electronic module 22, identified as "EM" in the figures, in electrical communication therewith. Preferably, the first zone 18 of data ports includes a test port 23 disposed proximately thereto for permitting connection of a test plug. A second zone 24 of data ports 26 may also be congregated on another patch panel or network rack, and each of the data ports 26 is electrically connected directly with one of the destination devices 16. Each of the data ports 26 has an electronic module 28 in electrical communication therewith. Preferably, the second zone 24 of data ports includes a test port 29 disposed proximately thereto for permitting connection of a test plug. Additionally, the source device 14 preferably includes an electronic module 30 in electrical communication therewith and the destination devices 16 each include an electronic module 32 in electrical communication therewith. In FIG. 1, connective lines represent possible electrical connections that may be achieved by the use of patch cords and cables, and an exemplary system having six destination devices connected to a source device is shown.

Figure 2:
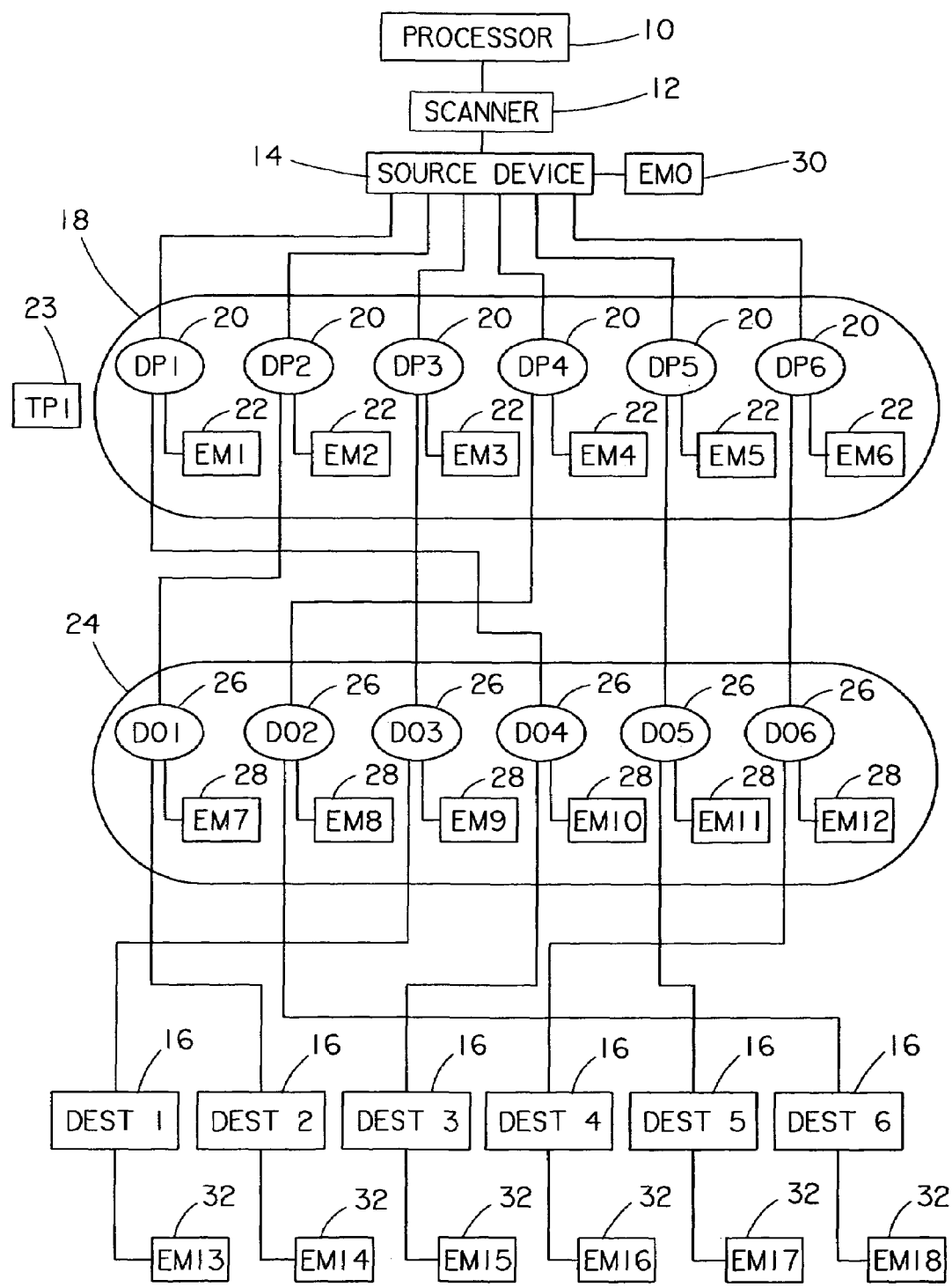
FIG. 2 is a schematic view of a documentation system in accordance with a second embodiment of the invention.

FIG. 2 illustrates an interconnect configuration wherein the first zone 18 is a patch panel and the second zone 24 are the outlet ports to which the destination devices are connected. The destination devices have state of the art electronic modules with common address codes and unique identification codes.

The outlet ports are identified as "DO" in FIG. 2. The destination outlets, while not qualitatively different than the data ports 7–12 of FIG. 1, are disposed proximately to the destination devices 16 to which they are connected. This provides the benefit of knowing approximately where a particular destination device is physically located based on its proximity to a destination outlet which is fixed in the physical world. Thus, by focusing on the identification code of the electronic module of the particular destination outlet, rather than that of the destination device itself, the approximate location of the destination device may be ascertained by the system.

Among the many benefits of the invention is the ability to completely map out a particular network configuration. In status quo systems, when a source and destination are no longer in communication, it cannot generally be easily determined which link in the pathway that connects them is the problematic link. In the present invention, each intersection, i.e., LAN port, has associated with it an electronic module having a zone address code, and because response signals from a particular electronic module include the identification code of the module, pathways from a source to a destination can be more clearly identified on a link-by-link or zone-by-zone basis, and revision instructions can be more efficiently determined for a particular reconfiguration.

Another advantage of the invention relates to facilitating multiple concurrent revisions to a single system. By employing two or more test outlets, for example, with distinct revision system modules having distinct identification codes in the respective test outlets, multiple users can concurrently reconfigure/revise various aspects of a particular network configuration while the system makes the appropriate confirmations for each of the test plugs connected to each of the test outlets independently.

It should be noted that the above-described invention contemplates many embodiments not specifically described, and the explicitly described embodiments should be considered to be exemplary rather than definitional. As an example of an alternative not specifically described, without limitation or exclusion, the present invention may be employed in a network system having a distinct indicator, such as an LED, adjacent some or all of the LAN ports in the network. Such indicators may then be used to assist the revisor in identifying LAN ports requiring the insertion or removal of a cord plug.

What is claimed is:

1. A documentation system for a network having a source device which is connected to multiple network paths which are connected to destination devices, said documentation system comprising:
   a data port which includes an electronic module with an identification code on each of two or more of said network paths;
   each of said destination devices including an electronic module with an address code;
   said source device having the capability to send query signals along a designated network path addressed to a data port and destination device corresponding to said designated network path;
   said electronic module corresponding to said data port responding to said query addressed to said data port by transmitting its identification code to said source device; and
   said electronic module of said destination device responding to said query addressed to said destination device by transmitting its identification code to said source device,
   wherein said electronic modules are stratified into a plurality of zones, and said identification codes corresponding to each of said electronic modules within a particular zone having a common component distinctive only to said particular zone.

2. A documentation system in accordance with claim 1 further including a processor and scanner in communication with said source device and software executable by said processor which denotes said scanner and said source device to send said query signals to said electronic modules and to analyze said response signals returned to said source device from said electronic modules.

3. A documentation system in accordance with claim 1 wherein said source device transmits said query signals along respective ones of said network paths sequentially on a zone-by-zone basis.

4. A documentation system in accordance with claim 1 wherein along at least one of said network paths there are a plurality of data ports having electronic modules, each of said electronic modules having an identification code distinctive from each other and from the identification code of said electronic module corresponding to said destination device on said network path.

5. A documentation system for a network having a source device connected to a plurality of network paths, each of said network paths being connected to a destination device, said documentation system comprising:
   a data port corresponding to at least two of said network paths;
   an electronic module associated with each of said data ports, each of said electronic modules having an identification code;
   an electronic module associated with each of said destination devices, each of said electronic modules having an address code;
   a transmitter associated with said source device for transmitting query signals along respective ones of said network paths; and
   a receiver associated with said source device for receiving response signals from said respective ones of said network paths, wherein each of said electronic modules is capable of recognizing a particular query signal as corresponding to its identification code and responding to a transmission of such a query signal by returning a response signal having its identification code back to said source device, and wherein said electronic modules are stratified into a plurality of zones, each of said identification codes including a zone identifier portion, wherein each of said electronic modules within any particular zone has a common zone identifier portion.

6. A documentation system in accordance with claim 5 further including a processor in communication with said source device and software executable on said processor for analyzing said response signals returned to said source device from said electronic modules.

7. A documentation system in accordance with claim 5 wherein said transmitter transmits said query signals along respective ones of said network paths sequentially on a zone-by-zone basis.

8. A documentation system in accordance with claim 5 wherein along at least one of said network paths there are a plurality of data ports having electronic modules with zone identifier portions distinct from each other and from the electronic module corresponding to said destination device on said network path.

* * * * *